(12) United States Patent
Farnsworth et al.

(10) Patent No.: US 7,037,095 B1
(45) Date of Patent: May 2, 2006

(54) EXTRUSION DIE PLATE AND CUTTER ASSEMBLY WITH HYDRAULIC MOTOR

(75) Inventors: John T. Farnsworth, St. Joseph, MO (US); Jack K. Boatman, St. Joseph, MO (US)

(73) Assignee: Nestec S.A., Vevey (CH)

( * ) Notice: Subject to any disclaimer, the term of this patent is extended or adjusted under 35 U.S.C. 154(b) by 283 days.

(21) Appl. No.: 10/030,567

(22) PCT Filed: Jul. 6, 2000

(86) PCT No.: PCT/EP00/06612

§ 371 (c)(1),
(2), (4) Date: Mar. 21, 2002

(87) PCT Pub. No.: WO01/03900

PCT Pub. Date: Jan. 18, 2001

Related U.S. Application Data

(60) Provisional application No. 60/142,827, filed on Jul. 8, 1999.

(51) Int. Cl.
*B29B 9/06* (2006.01)

(52) U.S. Cl. .......................... 425/67; 425/67; 425/190; 425/196; 425/313; 425/382 R; 425/464; 83/402; 83/591; 83/612

(58) Field of Classification Search ................ 425/190, 425/67, 71, 196, 311, 313, 315, 316, 382 R, 425/464, DIG. 230, 308, 310; 82/11.5, 435.17, 82/435.22, 437.3; 137/565.19; 83/435.17, 83/435.22, 437.3, 402, 591, 612
See application file for complete search history.

(56) References Cited

U.S. PATENT DOCUMENTS

| | | | | |
|---|---|---|---|---|
| 2,764,952 A | * | 10/1956 | Meakin | 425/196 |
| 4,123,207 A | * | 10/1978 | Dudley | 425/67 |
| 4,564,350 A | * | 1/1986 | Holmes et al. | 425/313 |
| 5,110,523 A | * | 5/1992 | Guggiari | 264/40.5 |
| 5,525,052 A | | 6/1996 | Czarnetzki et al. | 425/183 |
| 5,641,529 A | | 6/1997 | Kunas | 426/516 |

FOREIGN PATENT DOCUMENTS

| | | |
|---|---|---|
| DE | 40 36 196 A1 | 5/1992 |
| GB | 1139212 | 8/1969 |
| JP | 5-169442 | 9/1993 |
| JP | 8-216150 | 8/1996 |

* cited by examiner

*Primary Examiner*—Joseph S. Del Sole
(74) *Attorney, Agent, or Firm*—Bell, Boyd & Lloyd LLC

(57) ABSTRACT

A die plate for an extruder is coupled directly to a fluid-driven motor on one side and to an extruder on the other side. Suitable fluid inlet and outlet passages are formed in the die plate to supply the motor with fluid and withdraw fluid. A cutter assembly includes a housing to receive the motor within and is coupled for rotation to an output shaft from the motor, so that in use blades mounted on the housing are caused to rotate into the path of extrudate and to sever it.

10 Claims, 4 Drawing Sheets

EXTRUSION DIE PLATE AND CUTTER ASSEMBLY WITH HYDRAULIC MOTOR

This application claims the benefit of Provisional Application No. 60/142,827, filed Jul. 8, 1999.

FIELD OF THE INVENTION

This invention relates to extrusion apparatus which includes a die plate through which extrudate is received and shaped, the extrudate being severed into discrete pieces as it emerges from the die plate by a cutter assembly having a blade that is rotated into the path of movement of the extrudate.

BACKGROUND OF THE INVENTION

Cutter assemblies for cutting extrudate have in the past been associated with electrically-driven motors. Such a cutter assembly will rotate about a fixed shaft mounted to the extruder and the coupling to a motor for rotation may be via a spool attached to a belt driven by the motor, as in U.S. Pat. No. 5,641,529, or via a universal drive connection that is itself coupled to another drive. Such assemblies are cumbersome because of the space occupied by the electric motor, the associated coupling means, and the framework necessary to support the motor unit.

An object of this invention is to provide means for rotating a cutter blade that may be integrated into the cutter assembly to thereby save space and facilitate maintenance of the extrusion apparatus.

SUMMARY OF THE INVENTION

In accordance with a first aspect of this invention, a die plate for an is modified to be coupled directly to a fluid-driven motor on one side and to an extruder on the other side. Suitable fluid inlet and outlet passages are formed in the die plate to supply the motor with motor driving fluid and to withdraw fluid. The die plate thus has:
  first coupling means for coupling the die plate on a first side thereof to an extruder defining a longitudinal axis,
  second coupling means for coupling the die plate on a second side thereof to a cutter assembly disposed on said longitudinal axis,
  apertures through which extrudate is received from the extruder and extruded for cutting into predetermined lengths by said cutter assembly,
  a fluid inlet passage for receiving motor-driving fluid into the die plate for delivery to said cutter assembly, and
  a fluid outlet passage for receiving fluid from said cutter assembly for discharge from the die plate, the cutter assembly having a fluid driven motor for rotating a cutter transversely to said longitudinal axis into the path of movement of extrudate so as to sever the extrudate.

In a preferred form of the invention, the die plate has a peripheral edge adjoining the first and second sides, the fluid inlet passage and fluid outlet passage each having a radial portion extending radially through said peripheral edge toward a central area of the die plate where each passage terminates in a respective longitudinal portion extending through said second side of the die plate.

The first and second coupling means preferably include a plurality of mounting apertures for receiving respective fasteners through the die plate.

According to a second aspect of the invention, a die plate and cutter assembly includes a die plate having first coupling means for coupling the die plate on a first side thereof to an extruder, defining a longitudinal axis, second coupling means for coupling the die plate on a second side thereof to a cutter assembly disposed on said longitudinal axis, apertures through which extrudate is received from the extruder and extruded for cutting into predetermined lengths by said cutter assembly, a fluid inlet passage for receiving fluid into the die plate for delivery to said cutter assembly, and a fluid outlet passage for receiving fluid from said cutter assembly for discharge from the die plate, the cutter assembly having a fluid-driven motor coupled to said second side of the die plate and adapted to receive motor-driving fluid from said fluid inlet passage in use and to discharge said fluid into said fluid outlet passage, and a rotatable cutter, driven for rotation transversely to said longitudinal axis by said motor, into the path of movement of extrudate so as to sever the extrudate.

The cutter assembly includes a housing which receives the motor within and is coupled for rotation to an output shaft from the motor.

In a preferred form of the invention, the rotatable cutter includes a housing coupled for rotation to said motor, the motor being receivable within said housing. The motor preferably includes an output shaft which may be coupled to the housing.

In a further preferred form of the invention, the housing includes blade mounting means for supporting at least one radially extending blade having a predetermined separation from said second side of the die plate and adapted to sever extrudate emerging therefrom in use.

The motor may be any fluid driven motor. A preferred embodiment is a hydraulic motor. An alternative preferred embodiment is a pneumatic motor.

The fluid inlet and outlet passages in the die plate may be thermally insulated from the extrudate outlet apertures. Insulation may be by means of a gap that may be filled with a gas. The gas may be air. The gap is preferably located around the fluid passages.

The invention extends in a further aspect to a cutter assembly for coupling to a die plate, and for cutting exudate emerging therefrom, the assembly comprising positioning means for positioning the assembly close to an extrudate outlet, a housing, a fluid-driven motor receivable to be mountable in the housing a cutting blade and mounting means for mounting the blade to the housing, so that, on actuation of the motor in use, the blade is caused to rotate into a path of movement of extrudate emerging from the said outlet, so as to sever it.

The positioning means may comprise coupling means for coupling the assembly to a die plate so that the blade is located to be a predetermined distance from the plate.

In a preferred form of the invention, the fluid-driven motor includes a fluid inlet directed toward the die plate for receiving driving fluid therefrom in use. The inlet is preferably directed to be located opposite a corresponding outlet in the die plate to which it is mountable.

BRIEF DESCRIPTION OF THE DRAWINGS

A preferred embodiment of the invention is described below with reference to the accompanying drawings, in which:

FIG. 1 is a schematic perspective view showing an extruder coupled to an electrically-driven motor;

FIG. 2 is a similar view to FIG. 1 showing an extruder coupled to a hydraulic motor in accordance with the invention;

DESCRIPTION OF PREFERRED EMBODIMENT

Figures 1, 2:
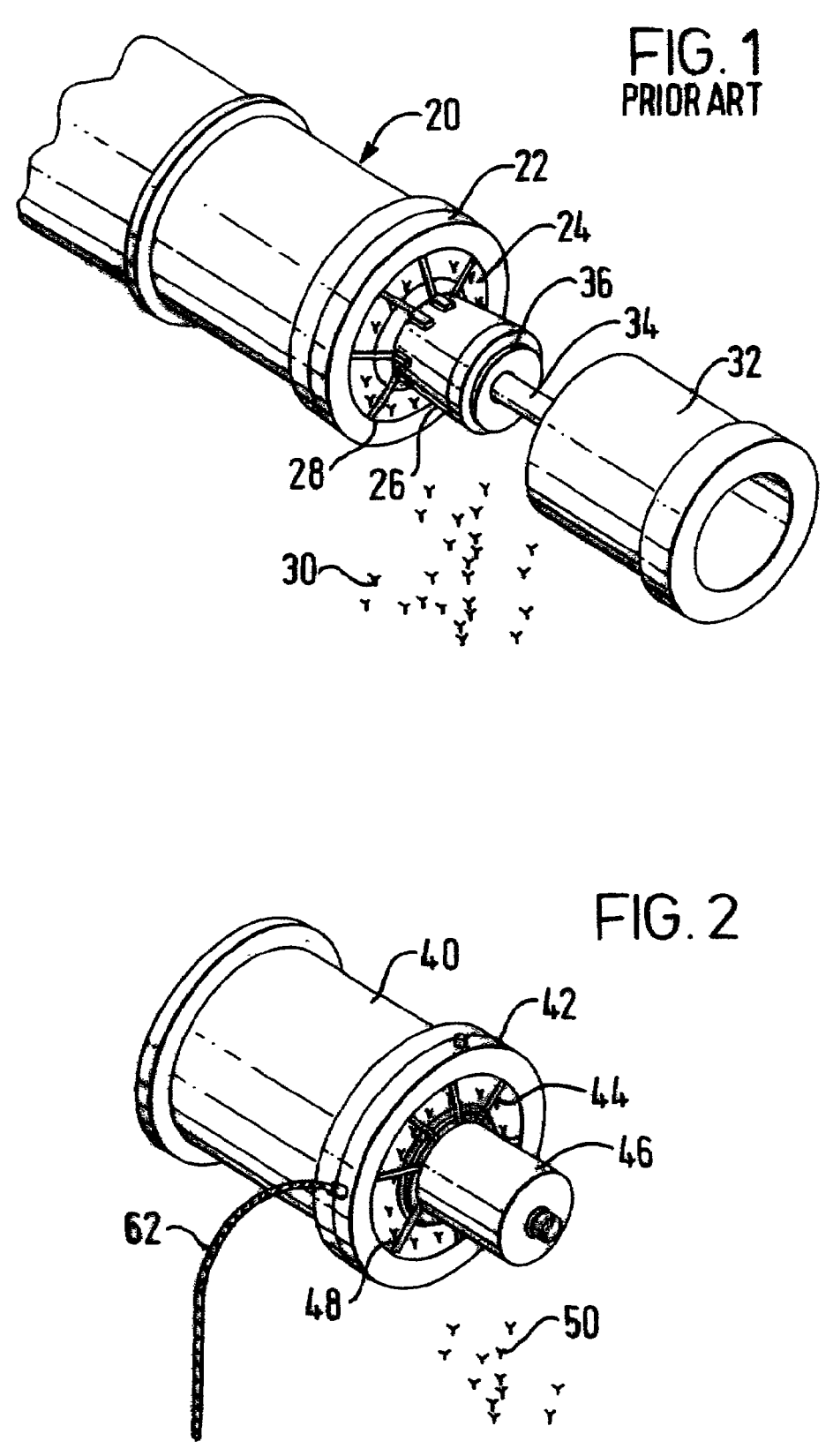
Figure 3:
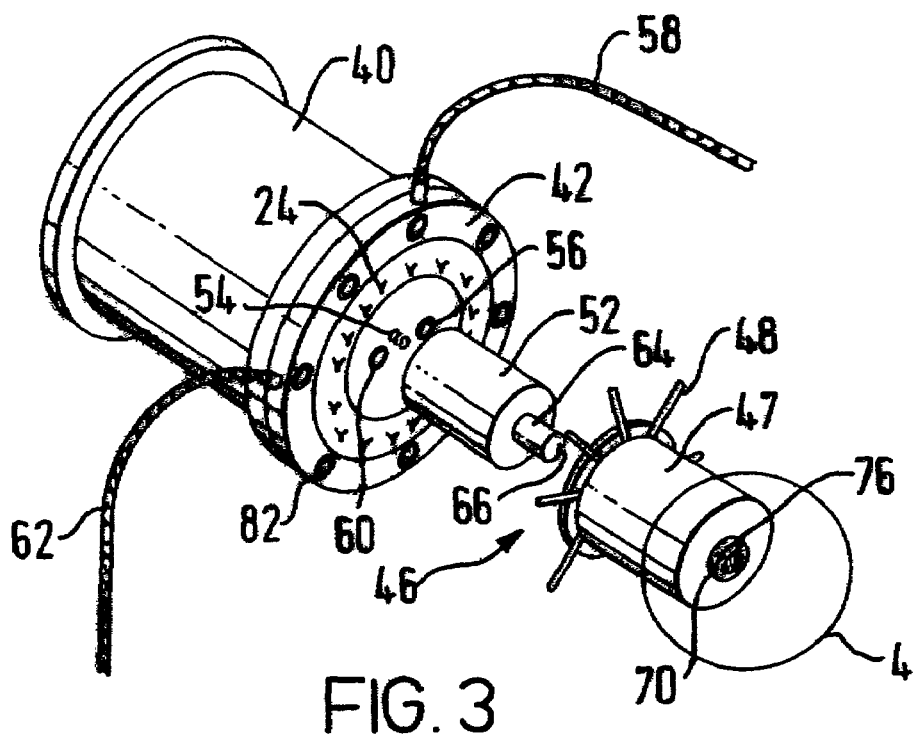
FIG. 3 is an exploded perspective view showing a housing for the cutter assembly of FIG. 2 spaced from the hydraulic motor.

An extruder generally indicated by reference numeral 20 in FIG. 1 comprises a longitudinally-extending housing which is coupled at one end to a die plate 22. The die plate 22 has a plurality of die openings 24 through which extrudate is received during operation of the extruder 20. A cutter assembly 26 is rotatably mounted to a shaft (not shown) and includes a plurality of radially-extending blades 28 which, when rotated, sever the extrudate into discrete pieces 30. An electrically-driven motor 32 with axially-tending driveshaft 34 is coupled to the cutter assembly 26 via a universal drive connection 36 mounted to one end of the cutter assembly 26 remote from the extruder 20. It will be understood that the motor 32 must be supported, for example, with an associated framework, in order to operate the cutter assembly without becoming unbalanced.

In accordance with the invention, the installation and operation of the extrusion apparatus is simplified considerably by integrating a fluid-driven motor into the cutter assembly. Non-limiting embodiments will now be described with reference to the remaining drawings. In FIG. 2 of the drawings, there is shown a conventional extruder 40 which includes a longitudinally-extending housing and is coupled at one end to a die plate 42 made in accordance with the invention. The die plate 42 has a plurality of die openings 44 for receiving extrudate from the extruder 40, in accordance with normal practice. A cutter assembly 46 is associated with the die plate 42 and includes a plurality of radially-extending blades 48 for cutting the extrudate into discrete pieces 50.

As can be seen more clearly from FIG. 3, the cutter assembly 46 includes a cylindrical housing 47 which houses a hydraulically-driven motor 52. The motor 52 is centrally mounted to the die plate 42 with mounting bolts 54 (only one of which is shown in FIG. 3). Alternatively, the motor 52 could be located eccentrically with respect to the die plate 42. A hydraulic fluid inlet passage 56 in fluid communication with a hydraulic fluid supply hose 58 is formed in the die plate 42 and is in fluid communication with the hydraulic motor 52. A hydraulic outlet passage 60 is also formed in the die plate 42 and is in fluid communication with a hydraulic fluid outlet hose 62 so as to withdraw hydraulic fluid from the hydraulic motor 52.

The hydraulic motor 52 has an output shaft 64 which extends longitudinally from the extruder 40 and has a longitudinally-extending key way 66. The output shaft 64 is received through an opening 68 formed in a boss 70 which extends longitudinally from the housing 47 for the cutter assembly 46 at one end opposite from the extruder 40. A second key way 72 is formed in the opening 68 and slidably receives a key 74. The key 74 is located between key ways 66, 72 and set screw 76 received through an aperture 78 formed in the boss 70 bears upon the key 74 to prevent longitudinal displacement of the key. This arrangement secures the cutter assembly 46 to the output shaft 64 of the hydraulic motor 52 so that, upon actuation of the motor, the blades 48 will rotate to sever the extrudate. It will be understood that there is a pre-determined separation between the cutter blades 48 and the outer surface of the die plate 42.

Figure 4:
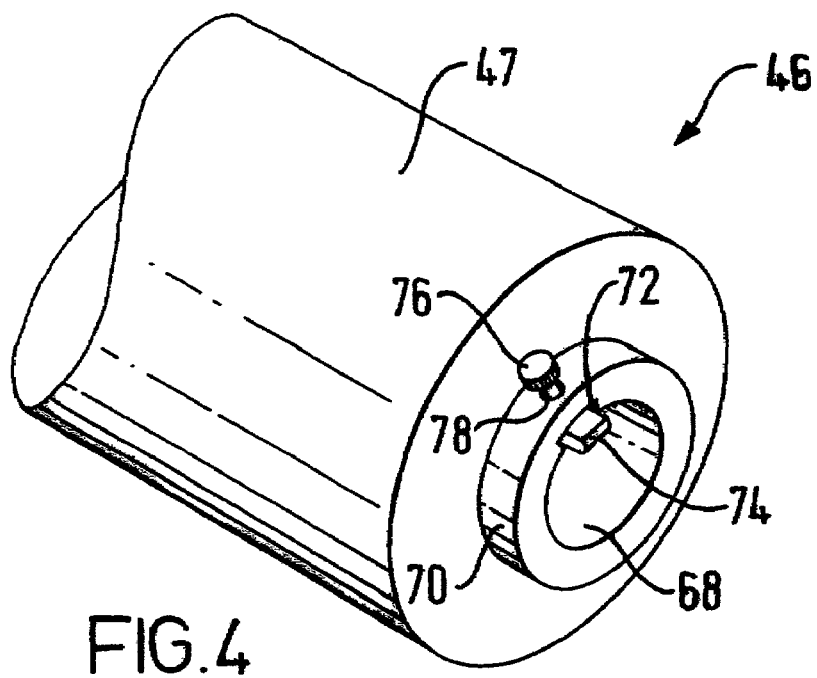
FIG. 4 is an enlarged view of circled area 4 in FIG. 3.
Figure 6:
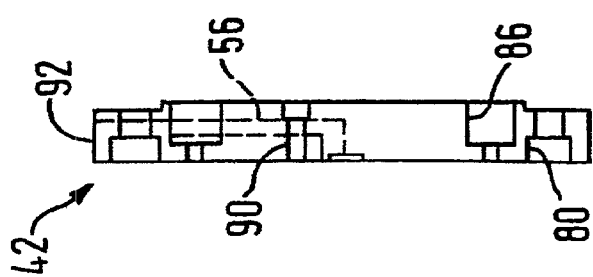
FIG. 6 is a side elevation view of the die plate of FIG. 5.
Figure 5:
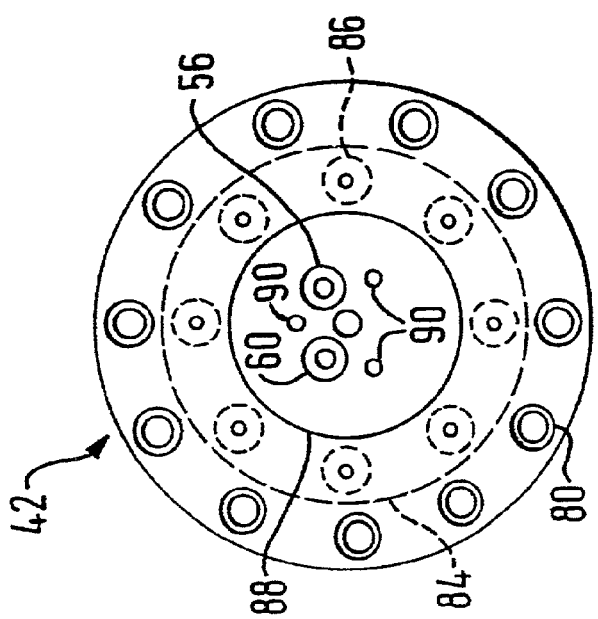
FIG. 5 is a front plan view of a die plate comprising the invention.
Figure 8:
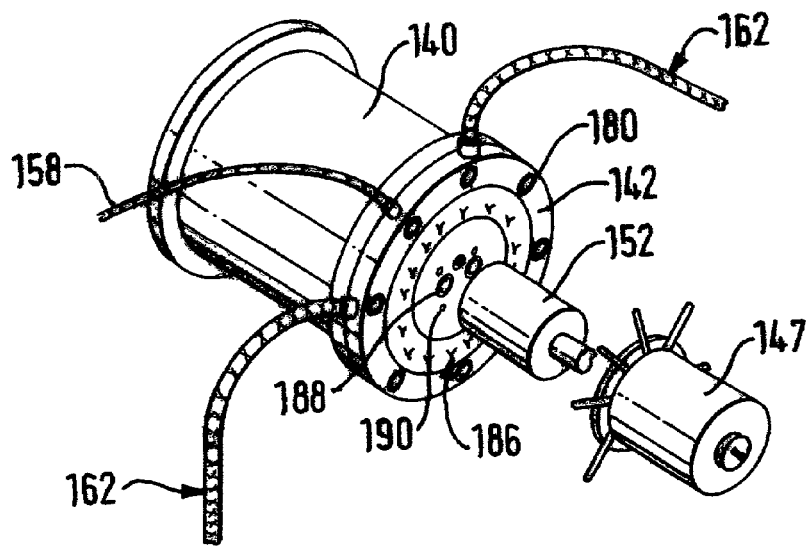
FIG. 8 is similar to FIG. 2, showing an extruder coupled to a pneumatic motor in accordance with the invention.
Figure 9:
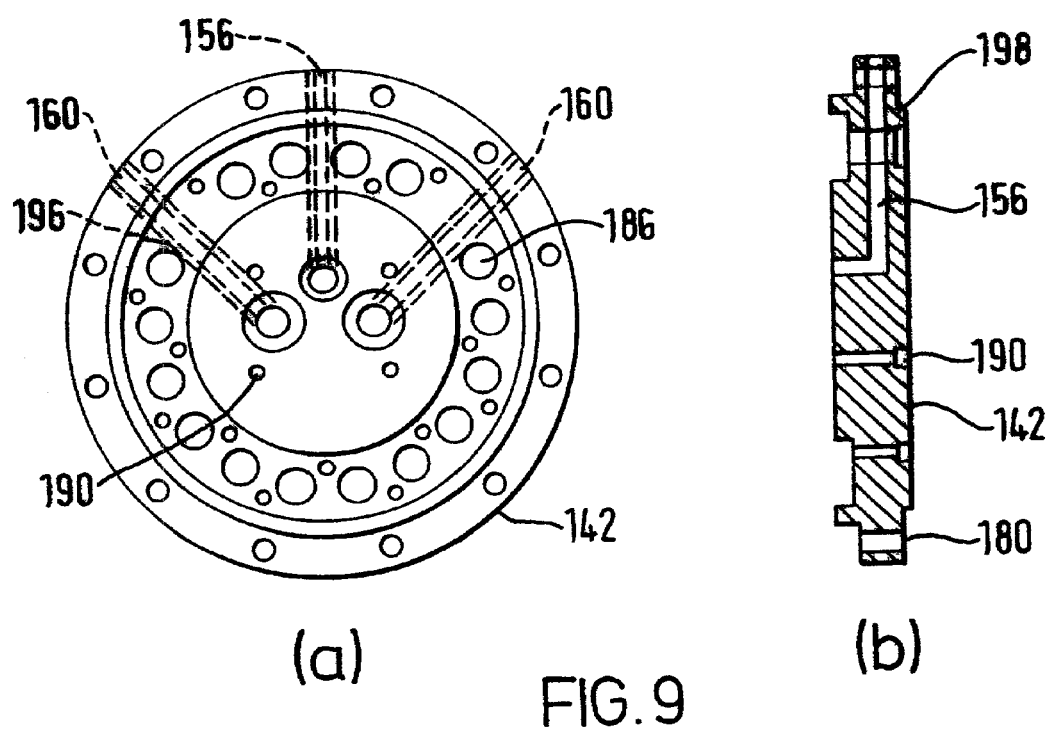
FIG. 9 provides back and sectional side views of die plate of FIG. 8.

The die plate 42 is shown in more detail in FIGS. 4 through 6. As will be common in the art, the die plate 42 has coupling means for coupling the die plate on an inner side thereof to the extruder 40 and these comprise a series of counter-sunk openings 80 equally spaced around the periphery of the die plate 42 through which mounting bolts 82 (FIG. 3) are received and threaded into cooperating threaded apertures (not shown) provided on the extruder 40.

The die plate 42 includes an inner ring 84 which has a series of equally-spaced openings 86 which define respective die nozzles through which extrudate is received and extruded. In a central area 88 of the die plate 42, three counter-sunk openings 90 are formed to receive the mounting bolts 54 that secure the die plate 42 to the hydraulic motor 52 (FIG. 3). It will be noted that counter-sunk openings 80 and 90 are oppositely directed in order to allow the die plate to be coupled to the extruder 40 and to the hydraulic motor 52 on respective sides thereof.

Figure 7:
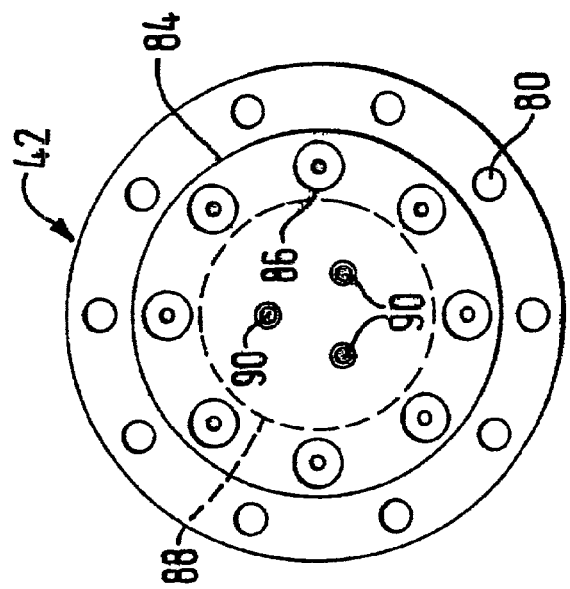
FIG. 7 is a back plan view of the die plate of FIG. 5.

The die plate 42 is shown in more detail in FIGS. 5 through 7. As will be common in the art, the die plate 42 has coupling means for coupling the die plate on an inner side thereof to the extruder 40, and these comprise a series of counter-sunk openings 80 equally spaced around the periphery of the die plate 42 through which mounting bolts 82 (FIG. 3) are received and threaded into cooperating threaded openings (not shown) provided on the extruder 40.

By integrating the hydraulic motor into the cutter assembly, the extruder installation is considerably simplified with attendant advantages in minimizing space required for installation and ease of maintenance.

Both the hydraulic inlet passage 56 and hydraulic outlet passage 60 (only one of which is shown in ghost outline in the side elevation view of FIG. 6) comprise a radial portion which extends radially from a peripheral edge 92 of the die plate 42 towards the central area 88 where the passages terminate in respective longitudinally-extending portions that terminate on the front side of the die plate 42 so as to communicate with respective passages provided in the hydraulic motor 52. O-ring seals (not shown) are seatable in the openings defining the hydraulic inlet passage and outlet passage 56, 60.

Compressed air tubes 158 and 162 connect with internal channels 156 and 160 within the body of the die plate 142. Surrounding each of the channels 156 and 160 is an insulating gap 196, to provide thermal insulation between the tube and the die plate material and extrudate passing through the die. The gap is filled with air, but it will be appreciated that many other gases would be suitable as substitutes.

As in the case of the equivalent liquid delivering tube described above in respect of the hydraulic counterpart, the air delivering passages extend radially to the central region of the die plate 142 and then change direction to be axially directed for coupling to the corresponding fluid ports on the pneumatic motor in central region 188 of the die plate. The die plate includes nozzle-receiving formations 186 for extrudate release and a mechanical seal 198 for facilitating fluid-tight coupling to the extruder.

It will be appreciated that several further variations may be made to the above-described preferred embodiment of the invention within the scope of the appended claims. In particular, it will be noted that, while hydraulic and pneumatic motors have been described, any fluid-driven motor may be accommodated into the above-described arrangement. It will also be appreciated that the key way coupling of the output shaft from the hydraulic motor to the cutter assembly may be modified, as required, as will be appreciated by anyone skilled in this art.

Finally, it will also be immediately apparent that the manner of mounting the cutter blades to the cutter assembly may be modified, as required, to suit the intended application and that a single cutting plate may be substituted for a plurality of cutting blades.

What is claimed is:

1. An assembly comprising a die plate, a cutter assembly and a fluid-driven motor,
   the die plate having first coupling means for coupling the die plate on a first side thereof to an extruder that defines a longitudinal axis, and including apertures through which extrudate is received from the extruder and extruded for cutting into predetermined lengths by said cutter assembly,
   the cutter assembly being disposed on said longitudinal axis and comprising a rotatable cutter driven for rotation transversely to said longitudinal axis by said motor into the path of movement of extrudate, so as to sever the extrudate,
   the assembly including
   second coupling means for coupling the die plate on a second side thereof to the cutter assembly,
   the die plate includes a fluid inlet passage for receiving fluid for delivery to said cutter assembly and a fluid outlet passage for receiving fluid from said cutter assembly for discharge from the die plate, and
   the fluid-driven motor is coupled to said second side of the die plate and is adapted to receive motor-driving fluid from said fluid inlet passage and to discharge said fluid into said fluid outlet passage.

2. An assembly according to claim 1 in which the rotatable cutter includes a housing coupled for rotation to said motor, the motor being received within said housing.

3. An assembly according to claim 1 wherein the housing includes blade mounting means for supporting at least one radially extending blade having a predetermined separation from said second side of the die plate and adapted to sever extrudate emerging therefrom in use.

4. An assembly according to claim 1 wherein the first and second coupling means comprise respective oppositely directed counter-sunk openings.

5. An assembly according to claim 1 wherein the motor is a hydraulic motor.

6. An assembly according to claim 1 wherein the die plate includes thermal insulation means between the fluid inlet and outlet passages and the extrudate apertures.

7. An assembly according to claim 6 wherein the insulation means comprises a gap.

8. An assembly according to claim 7 wherein the gap is gas-filled.

9. An assembly comprising:
   a die plate having a first coupling member for coupling the die plate on a first side thereof to an extruder that defines a longitudinal axis, and including apertures through which extrudate is received from the extruder and extruded for cutting into predetermined lengths by said cutter assembly,
   a cutter assembly that is located on said longitudinal axis and comprising a rotatable cutter that rotates transversely to said longitudinal axis into the path of movement of extrudate, and a second coupling member for coupling the die plate on a second side thereof to the cutter assembly,
   a die plate including a fluid inlet passage for receiving fluid for delivery to said cutter assembly and a fluid outlet passage for receiving fluid from said cutter assembly for discharge from the die plate, and
   a fluid-driven motor, wherein said motor is coupled to said second side of the die plate and is adapted to receive motor-driving fluid from said fluid inlet passage and to discharge said fluid into said fluid outlet passage.

10. A cutter assembly for cutting extrudate comprising:
    positioning means for coupling the cutter assembly to a die plate and for positioning said cutter assembly close to an extrudate outlet;
    a housing;
    a fluid-driven motor receivable to be mountable in the housing, wherein the motor includes a fluid inlet directed toward the die plate to receive driving fluid therefrom;
    a cutting blade that, on actuation of the motor in use, is caused to rotate into a path of movement of extrudate emerging from the said extrudate outlet so as to sever it; and
    mounting means for mounting the cutting blade to the housing.

* * * * *